Nov. 13, 1923.

E. HOPKINSON ET AL 1,474,149

PROCESS AND APPARATUS FOR MANUFACTURING TIRE CASINGS

Original Filed Sept. 24, 1921   4 Sheets-Sheet 1

Inventors
ERNEST HOPKINSON &
JOHN P. COE
By their Attorney

Nov. 13, 1923. 1,474,149
E. HOPKINSON ET AL
PROCESS AND APPARATUS FOR MANUFACTURING TIRE CASINGS
Original Filed Sept. 24, 1921   4 Sheets-Sheet 2

Inventors
ERNEST HOPKINSON &
JOHN P. COE
By their Attorney
Walter L. Piper

Patented Nov. 13, 1923.

1,474,149

UNITED STATES PATENT OFFICE.

ERNEST HOPKINSON AND JOHN P. COE, OF NEW YORK, N. Y.; SAID COE ASSIGNOR OF HIS ENTIRE RIGHT TO THE HARTFORD RUBBER WORKS COMPANY, A CORPORATION OF CONNECTICUT.

PROCESS AND APPARATUS FOR MANUFACTURING TIRE CASINGS.

Application filed September 24, 1921, Serial No. 502,937. Renewed April 23, 1923.

*To all whom it may concern:*

Be it known that we, ERNEST HOPKINSON and JOHN P. COE, both citizens of the United States, and residents of New York, county of New York, and State of New York, have invented a certain new and useful Process and Apparatus for Manufacturing Tire Casings, of which the following is a full, clear, and exact description.

This invention relates to a process and apparatus for manufacturing tire casings for motor vehicles. It aims to economize in the material, labor and equipment costs incident to their manufacture, particularly in transforming a carcass or casing to tire shape from a pulley-band form in which it has been built out of rubber composition and strain resisting elements—cords or plies of fabric.

After building a laminated pulley-band and in preparation for vulcanization or other ancillary operations that may desirably precede vulcanization, the built up pulley-band must be brought to tire shape. And if it is to be vulcanized under an internal fluid pressure, as is desirable for many reasons both from a commercial and an article standpoint, the space between the bead portions of the casing must be sealed off so as to permit the introduction inside the casing of gas, or other inert medium, at a pressure around 175 pounds more or less. Heretofore, the forming to shape has been accomplished by expanding a pneumatic tube interposed between the inner face of the pulley-band and a metallic drum while the bead portions of the pulley-band were brought nearer together into a predetermined relation. In this operation the casing was mounted temporarily upon a rim with flanged side rings holding its beads against outward movement, but not necessarily with a fluid tight joint. Afterwards, the casing was prepared for vulcanization by demounting it from the special rim and re-mounting it upon a "sealing" or "bull" ring, whose function it was to close the space between the beads during vulcanization, especially when the casing was subjected to an internal fluid under pressure directly contacting with the interior of the tire during vulcanization.

The present invention comprehends a process and apparatus for forming the pulley-band to tire shape with fluid directly contacting its inner surface while mounting it upon a device which closes the space or opening between its bead portions and makes the casing ready for vulcanization, or other ancillary treatment that may desirably precede vulcanization, thus eliminating the use of the perishable pneumatic or inflating tube and the necessity of remounting the casing upon another annular member suitable for supporting its beads during vulcanization. A less complicated machine is required, equipment is reduced, operations are eliminated and the cost of producing tire casings is consequently reduced.

With the illustrated embodiments of the invention in mind and without intention to impose limitations beyond what is required by the prior art, the invention, briefly stated, consists in a species of press constructed to seal off a definite volume of space around the inside of a pulley-band and between the angular-form-rings of a sealing device and the abutment members of the press so that upon operation of the press, the casing may be shaped with its beads in a predetermined relation and mounted fluid tight upon the sealing device, the ring parts of the latter being then locked to prevent egress of the fluid trapped within the shaped casing as it is seated thereon.

Embodiments of the invention are illustrated in the accompanying drawings in which:—

The pulley-band 1 may be built of superimposed layers 2 of strain resisting elements in the form of cords or plies more or less thinly coated with rubber, and ordinarily with an outer layer of vulcanizable rubber composition 3 more or less thickened at the tread region. A suitable apparatus for building the pulley-band is disclosed in a prior patent to E. Hopkinson, No. 1,310,701, granted July 21st, 1919. And in the margins of the pulley-band, inextensible elements, such as wires, may, or may not, be incorporated according to the disclosure in another patent to E. Hopkinson, No. 1,374,505, granted April 12th, 1921. In the drawings, the inextensible beads are conventionally indicated at 4.

According to our invention, the pulley-band, however it may be built, is inflated with fluid, preferably air, or other suitable gas, in direct contact with its inner surface and simultaneously the bead portions are mounted on a sealing device, preferably but not necessarily, in a predetermined spaced relation ready for vulcanization, or other treatment prior thereto.

One form of press suitable for practicing the invention is illustrated in Figs. 1 to 5, inclusive. Therein, abutment members 10 and 11 are shown slidably mounted and guided on a cylindrical shell 12, which is suitably fixed to and supported by an upright cylindrical base 13 wherein are vertically operable a series of rams or plungers 14 fixed to and carrying the lower abutment member 11. From the valve controlled line 15, which is connected to a circular header 16, separately piped as at 17 to each of the cylinders 18, fluid may be supplied under pressure to lift the rams or plungers, their descent by gravity being permitted by exhaust through a valve controlled line 19, also connected to the header 16.

Figures 1, 2:
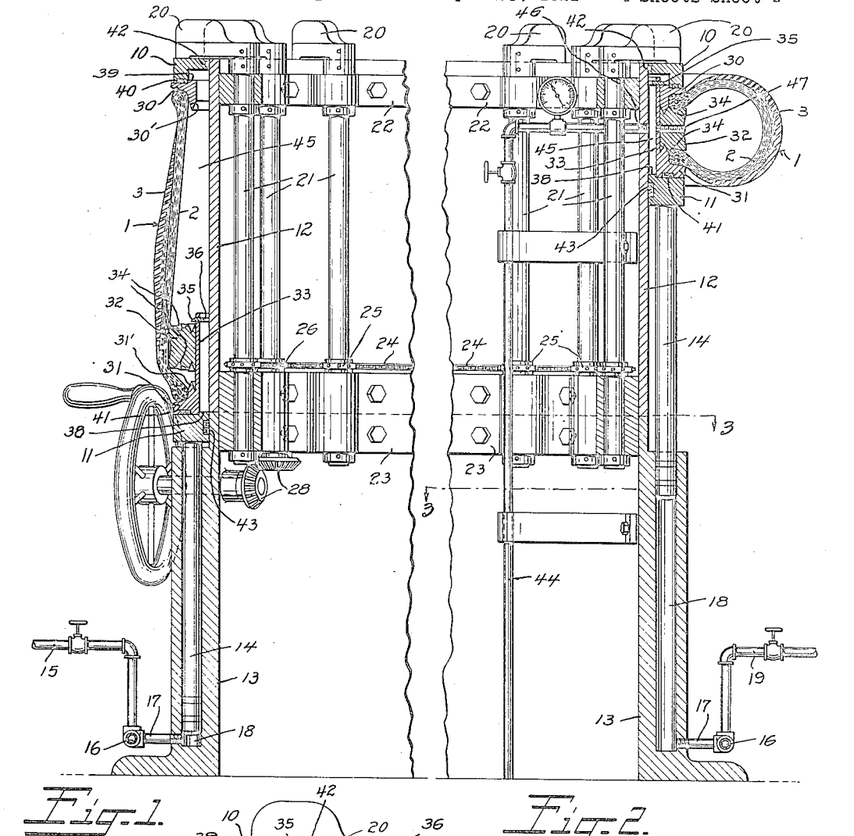
Figs. 1 and 2 are vertical sections of opposite halves of one form of apparatus suitable for practicing the invention, at the beginning and end of a single operation of the machine.
Figure 3:
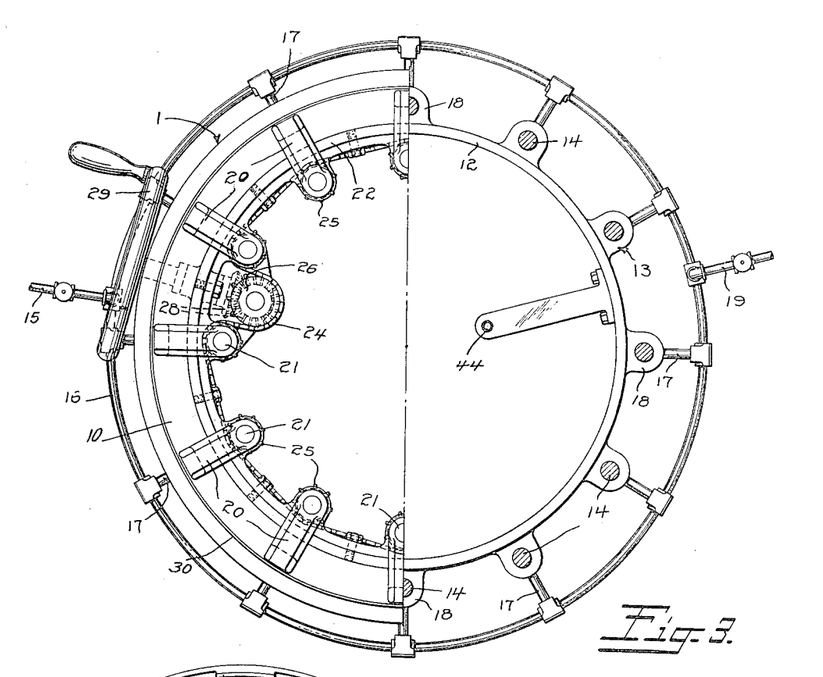
Fig. 3 is a plan view of the machine with the right half appearing in section on the line 3—3 Fig. 2.
Figure 4:
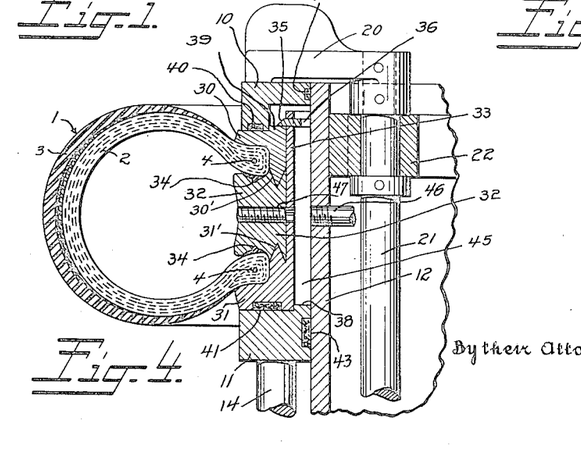
Fig. 4 is an enlarged vertical section of the pulley-band after it has been shaped and mounted on a sealing device in a position ready for vulcanization, or other treatment.
Figure 5:
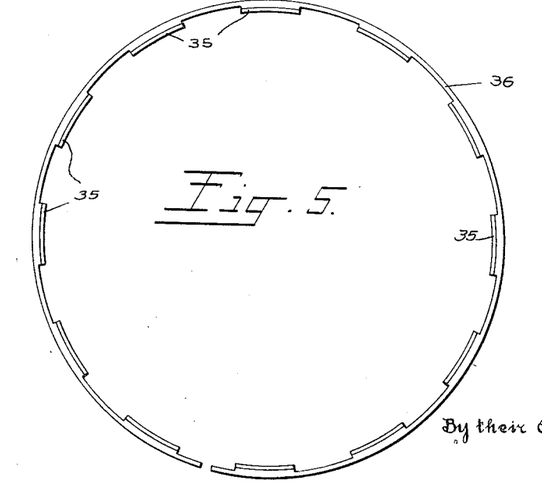
Fig. 5 shows a locking or snap-ring used with the sealing ring of Fig. 4.
Figures 6, 7:
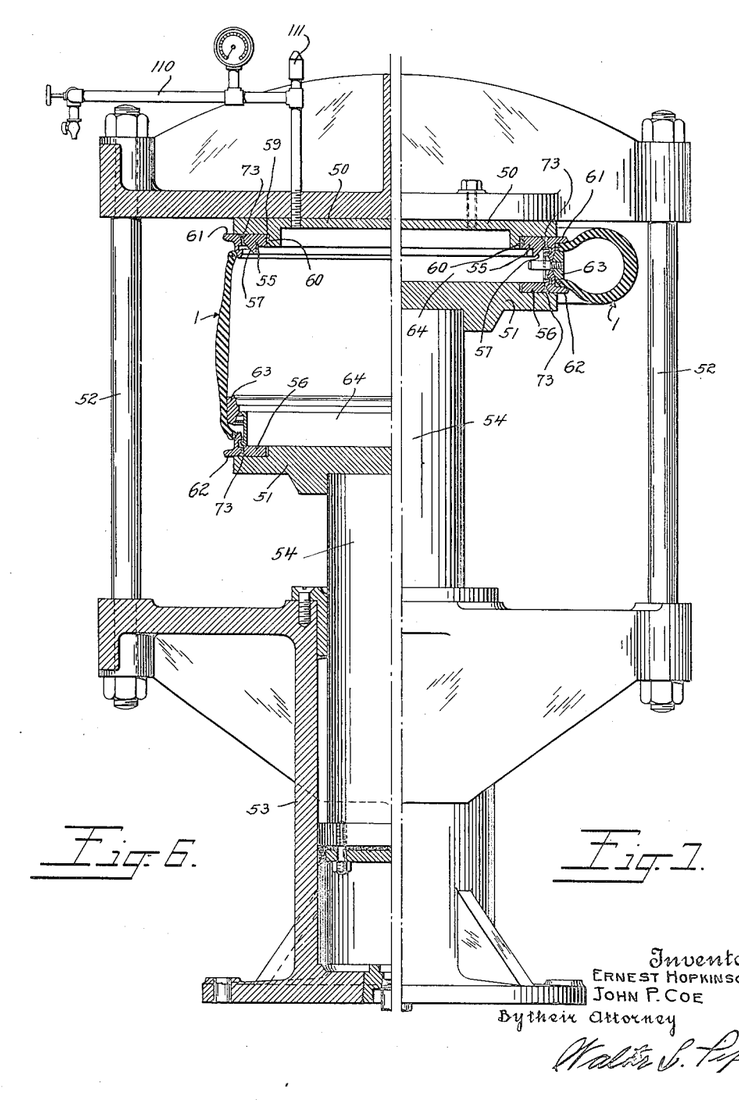
Figs. 6 and 7 are views, similar to Figs. 1 and 2, of another suitable form of apparatus.

The upper abutment member 10 is limited against upward movement by a series of arms 20 on endwise immovable shafts 21, which are suitably journaled in supports 22 and 23, inside and fixed to the shell 12. The arms 20 are adapted to be moved, from the overhanging position in which they are shown to a position permitting unobstructed mounting and demounting of the abutment member 10 and pulley-band 1, by a chain 24 engaging sprockets 25 on each shaft and also a sprocket 26 on a stub shaft, which is journaled in the support 23 and driven by bevel gears 28 connected to a handwheel 29.

In conjunction with the machine, a number of annular bead sealing devices are employed, only one being used at a time however. Each of these consists of a pair of carrier-rings or angular-form bead-engaging-members 30 and 31 and an intermediate bead-spacing-member 32, the latter being preferably slidably mounted on a cylindrical extension or sleeve portion 33 of the lower bead-engaging-member, which extension is provided with a circularly arranged series of slots for the reception of lugs 35 on a split ring 36 shown in Fig. 5. The lugs 35 are suitably beveled on one face, as illustrated, to permit the upper bead-engaging-member 30 to pass the snap ring, which functions to lock the parts together in the predetermined relation shown most clearly in Fig. 4, where the interfitting construction of the bead-engaging and bead-spacing members makes a substantially closed metallic joint. The outside bead-engaging members 30 and 31 are each equipped with beveled faces 30' and 31', which facilitate the initial seating of the bead portions of the pulley-band thereon, and assist in centering and paralleling the margins of the pulley-band relative to the bead-engaging-members. To absolutely insure a fluid tight seal of the pulley-band when finally shaped, a strip or coil 34 of rubber, or other suitable material, may be located in a channel in the side walls of the intermediate bead-spacing-member 32.

The lower abutment member 11 is provided with a shouldered portion 38, and the upper bead-engaging-member 30 is likewise shouldered at 39 to center the bead-engaging-members relative to the abutment members. And fluid tight connections or gaskets are provided at 40 and 41, between the bead-engaging-members and the abutment members, and also at 42 and 43, between the abutment members and the shell 12, to permit sealing off, or trapping, inside the pulley-band and between its beaded portions, a definite space or volume of air, gas, or other suitable fluid, which, if compressible, may be utilized in the closure of the press to expand the pulley-band to tire shape. But in this form of apparatus an inert gas under pressure may be economically supplied through the valve controlled pipe line 44 in communication with the space 45 between the pulley-band and the shell 12, the connection being made at 46 adjacent the head of the machine. The intermediate bead-engaging-member 32 is preferably provided with a valve 47 of a suitable self-acting type to permit supplying to the interior of the shaped and mounted casing, fluid under pressure, such as $CO_2$, or other gas, during the subsequent or final curing operation without breaking the seal of the beaded portions of the casing.

A second form of apparatus for practicing this invention is illustrated in Figs. 6 to 10 of the drawings. In this type of press, the abutment members are in the form of solid platens 50 and 51, the upper of which is fixed against movement and supported by widely separated pairs of stanchions 52, which are anchored to the base 53 of the machine. The base 53 is bored out to receive the ram 54, actuatable by fluid under pressure arranged to be supplied and exhausted therefrom in a well-known manner. This ram carries the lower platen 51. Each of the platens is suitably machined to receive platen-rings 55 and 56, the former being beveled, as indicated at 57, for centering purposes and to rectify any canting of the pulley-band. On its inner periphery platen-ring 55 is provided with a circular groove 58 and with notches 59 for the passage of lugs or keys 60 fixed to the upper platen 50, whereby a species of bayonet-slot connections are provided for convenient attachment of the upper platen-ring 55. The lower platen-ring 56 may be laid loosely on the lower platen 51, or screwed thereto at one or more places to insure against its displacement. Both platen-rings 55 and 56 are thus removably fixed to the platens of the press in a manner permitting their replacement by similar rings of smaller or larger external diameter to accommodate different sized tires and enable one press to be used for any sized tire.

Figures 8, 12:
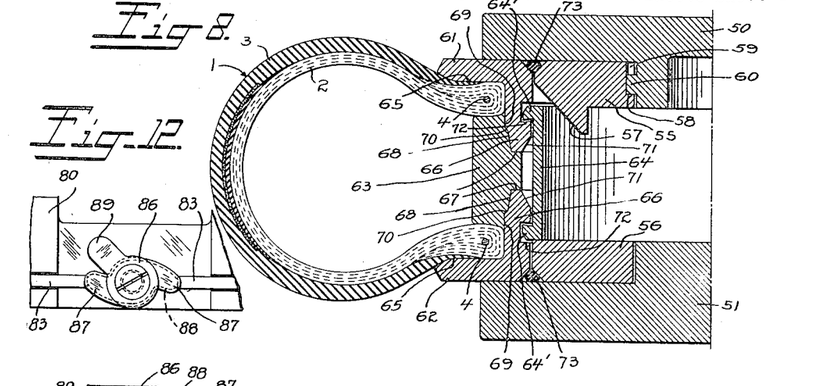
Fig. 8 is an enlarged vertical section of the pulley-band as it appears after being shaped on the apparatus of Figs. 6 and 7, in dotted lines therebelow appearing successive positions of one bead-portion of the pulley-band relative to its carrier-ring or bead-engaging-member constituting part of the sealing device and illustrating a desirable rolling of the bead-portion.
Figs. 12 and 13 illustrate a cam mechanism suitable for operating a snap-ring used in conjunction with the modification of Fig. 11.
Figures 9, 13:
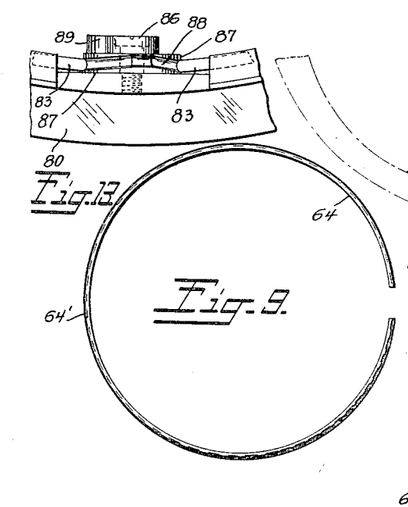
Figs. 9 and 10 show a snap-ring and an upper platen ring, respectively, used in conjunction with the apparatus of Figs. 6, 7 and 8.
Figure 10:
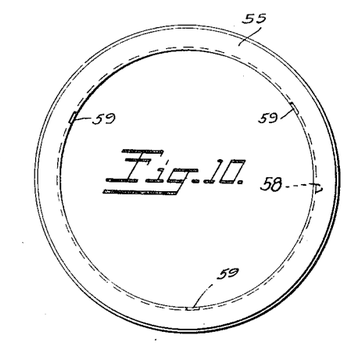

With this form of apparatus, any suitable number of sealing devices are also provided, each of which consists of two carrier-rings or outside bead-engaging-members 61 and 62, an intermediate bead-spacing-member 63, and a locking split-ring 64, which latter is shown separately in Fig. 9. The outside bead-engaging-members 61 and 62 have substantially parallel side portions 65 for engaging the sides of the tire beads and oppositely extending base portions 66 for engaging underneath the tire beads. Excepting for their opposite angularity, they are of duplicate construction. The side portion 65 of each is suitably curved, as shown, to engage without marring the side wall of the casing immediately above the bead. The base portion 66 of each bead-engaging-member is provided with a thrust face 67, a conical or otherwise suitably tapered face 68, and a cylindrical face 69, of preferably exactly the right diameter in which the tire bead is to be cured. Between the surfaces 68 and 69, of each of the members 61 and 62, a shoulder or hump 70 is formed to so frictionally oppose sliding movement of the tire bead on the bead-engaging-member or carrier-ring, as to insure the bead rolling over from a more or less horizontal to a more or less vertical position. The action referred to is illustrated diagrammatically below Fig. 8 of the drawings in the dotted line positions assumed by the lower bead-engaging-member 62 during the progress of an operation.

On the inner face of each of the carrier rings or bead-engaging-members 61 and 62, is provided an inclined surface 71 and in the rear thereof a circular groove or channel 72. Into the grooves 72, the lips 64' of the locking ring 64 are adapted to enter to hold the carrier rings or bead-engaging-members 61 and 62 locked in predetermined relation at the end of a mounting operation, the entry of the locking ring being facilitated by suitably beveling the outside corners of the lips 64'.

The intermediate bead-spacing-member 63 of the sealing device is shaped to interfit with the oppositely extending base portions 66 of the carrier-rings, preferably, however, so as to permit the thrust face 67 to be clamped positively against it and not only substantially seal off the exit of trapped inflating fluid, but also insure equal and proper spacing of the side portions 65 of the bead-engaging-member relative to the opposed walls of the intermediate bead-spacing-member 63. It is to be understood that the bead portions of the pulley-band, as they are received, are more or less semi-circular in cross-section, and are preferably confined and squeezed to a more or less U-shaped form in cross-section in the operation of seating them on the sealing device. The cross-sections in Figs. 8 and 4, clearly show this latter form, the confining and squeezing of the tire beads being in some cases solely relied upon to insure a substantially fluid tight joint. In this connection the opposed thrust faces 69 and the intervening portion of the central member 63 enable the amount of tire bead compression to be nicely regulated or governed, as well as reduce the liability of leakage.

To make a fluid tight connection or joint between the platens 50—51 and the bead-engaging-members 61—62, a gasket of rubber, or other suitable material, is provided as indicated at 73.

Figure 11:
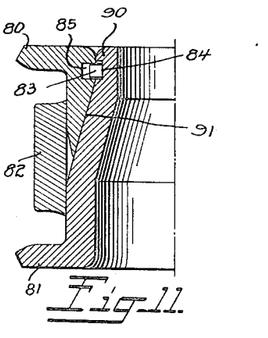
Fig. 11 shows a modified construction of a sealing device.

In Figs. 11, 12 and 13, a further modified form of sealing device is illustrated. This consists of three main parts, the outside bead-engaging-members 80 and 81, and an intermediate bead-spacing member 82. Their general shape in cross-section is much the same as the form illustrated in Fig. 8, but their locking is effected by a split-ring 83, which normally assumes the contracted position shown in Fig. 11, in the bottom of a groove 84, provided in the lower bead-engaging-member 81, the upper bead-engaging-member 80 having a similar opposed groove 85, permitting the ring to be expanded to a passage not obstructing assemblage of the parts. The distending of the split-ring 83 may be accomplished in any convenient manner, but preferably as shown by a species of cam indicated generally at 86, having two oppositely disposed curved arms 87 which have grooved faces or side walls 88, for engaging the opposite ends of the split-ring 83. A handle 89 is provided for turning the cam to or from the position shown in Fig. 12, in the illustrated position the split-ring being distended as to lie clear of the upper flanged portion 90 of the lower bead-engaging-member 81. The cam 86 is adjusted to the position shown in Fig. 12 at the start of an operation and when the beveled faces 91 of the bead-engaging-members 80 and 81 come together in the position shown in Fig. 11, the arm or handle 89 of the cam is turned by contact with a suitably interposed block, or like instrument, so as to permit the ends of the split-ring 83 to approach each other, thus allowing the parts to be locked together in the position shown in Fig. 11.

Figure 14:
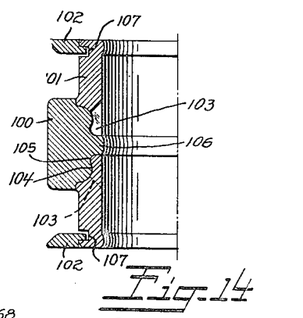
Fig. 14 shows a further modified construction of a sealing device.

In Fig. 14 a still further modification of the sealing device is illustrated. In this form there is an intermediate bead-spacing-member 100, flanking bands 101, and outer side rings 102. Each of the bands 101 is of duplicate construction and is provided with saw-cuts 103, to allow the metal between the saw-cuts to spring, or yield, sufficiently at least to pass the round shoulders 104 on the underside of the bead-spacing-member, which round shoulders are slightly less in diameter than the channels 105 on the inside of the intermediate member and adjacent the inwardly projecting flange 106 thereof. Remote from the intermediate member, each of the bands 101 is provided with a groove 107 for the reception of the side rings 102, which side rings are split so that they may be removed and replaced as desired. In this form of construction, however, the grooves 107 for receiving the snap rings are preferably made sufficiently wide to permit slight approach of the side rings 102 towards each other and the establishment of a fluid tight grip on the tire beads.

The procedure followed in using the apparatus that has been described above in detail is much the same in all forms, sufficiently so, at least, to permit the description of one to serve for all. With reference to the form of the apparatus illustrated in Figs. 6 to 10, inclusive, which is the simplest and preferred form, the proper size platen-rings 55 and 56 having been first mounted upon the upper and lower platens, sealing strips or gaskets 73 of rubber, or other suitable material, are first applied to furnish a fluid tight joint in the subsequent closing operation of the press. The lower carrier-ring or bead-engaging-member 62 is then positioned on the lower platen 51, being centered about the platen-ring 56. A snap or locking ring 64 is then mounted on the carrier-ring 62 with its lower lip 64' engaged in the channel 72. Then the pulley-band is made ready for introduction in the press by inserting the intermediate or bead-spacing-member 63 of the sealing device within it about in the position illustrated in Fig. 6. Placed close to the bead, as shown, the spacing-member 63 may be used to set the green stock with a flare. This has been found to be of advantage, in fact, it is desirable in practice after one margin of the pulley-band adjacent the bead has become set with a slight flare to similarly position the central sealing-member 63 relative to the other margin of the pulley-band, thereby to similarly set it with a flare. Such initial setting of the pulley-band, slightly trough-shaped in cross-section, facilitates the subsequent operations in which the pulley-band is formed to tire shape. When the pulley-band is thus prepared, the upper carrier-ring or bead-engaging-member 61 is loosely positioned upon its upper margin and the assembled band and rings are then bodily introduced in the press. The lower margin of the pulley-band is rested on the beveled surface 68 of the lower carrier-ring 62. The ram of the press is then elevated to bring the upper carrier-ring 61 into engagement with the upper platen 50. As the ram rises, the upper carrier-ring will be centered by the somewhat extensive conical surface 57 of the upper platen-ring 55, this centering insuring proper seating of the upper carrier-ring in superposed relation to the lower. As the ram continues to rise, each bead portion of the casing will be gripped sufficiently tightly against the shoulder 70 on the carrier-rings 61 and 62 to seal off more or less completely the space inside the pulley-band and between the platens. If air, or other gas, is within the space, it will be compressed to a pressure depending upon the distance between the platens when the seal was first effected. If the tire be of average size, say 4½ or 5 inches, the trapped gas, or air, will be compressed sufficiently to ordinarily form the pulley-band to tire shape. If the tire is of relatively small size, it may be necessary to supply air, or gas, under pressure to the inner surface of the pulley-band through the valve controlled line indicated at 110. On the other hand, if the tire is of large size, the pressure developed by movement of the platens together may be excessive and relief thereof may be provided for through a suitable form of valve indicated conventionally at 111.

When the platens have been moved to the positions shown in Fig. 8, the carrier-rings, intermediate bead-spacing-member, and locking-ring, will have been brought into the position illustrated in Fig. 8 in solid lines with their bead portions confined and gripped fluid tight between the opposed faces of the intermediate member 63 and the carrier-rings 61 and 62, the latter being locked against separation by the snap ring 64. And on the inside of the pulley-band, which has been formed to tire shape, air, or gas, is trapped at a pressure sufficient to maintain the tire in its transformed condition. The pressure of the trapped fluid will, of course, vary with the stroke of the ram after the bead portions of the casing have been sealed and with the amount of compressed air, or gas, if any, that has been supplied, or exhausted, after the seal of the tire beads has been perfected.

The tire thus mounted on the sealing device and filled with fluid under pressure above that of the atmosphere is then ready for vulcanization, or other treatment that may in some cases desirably precede vulcanization. While it may be vulcanized in any of the well-known methods, by wrapping, for instance, we prefer to introduce it into an ordinary sectional mold that has been suitably machined to receive the sealing device on which its bead portions are mounted and supported. After introduction in the mold, and suitably securing the mold sections against separation, we may draw off the compressed air, or other fluid, within the casing more or less completely and charge it with an inert medium, such as $CO_2$, at a suitable pressure around 175 pounds. After being so charged, the mold is heated in any suitable manner, preferably with steam at a vulcanizing temperature and pressure suited to the composition of the incorporated rubber It is to be understood, however, that any suitable fluid under pressure, either in the form of a liquid or gas, or a mixture of gases, such as air, may be employed to exert a wall-compacting pressure on the interior of the casings during vulcanization, and such fluids may be either initially charged in the individual molds before their introduction into the vulcanizing press or heater, or may be supplied to the interior of the casings from a source of supply outside of the vulcanizing presses through any of the well-known forms of "manifolding" apparatus.

Some of the advantages of the invention have already been pointed out, and many others will be obvious to those acquainted with the practical difficulties in manufacturing tires. Attention is called to the fact that the pulley-band is not necessarily gripped or confined by rigid parts, excepting at its largely fabric bead portions during its formation to shape. Consequently, it need not be injured or marred between its building and vulcanization. If partially cured, or subjected to a shaping operation between the time of its mounting on the sealing device and final vulcanization, these ancillary treatments are facilitated.

By the term "gas" as used in the claims, we mean to comprehend a single gas, such as $CO_2$, or a mixture of gases, such as air; and by the term "sealing device", any single or multi-part support for the bead portions of the casing.

In the foregoing, it has been endeavored to set forth the invention with sufficient particularity to enable those skilled in the art to practice the method and to build apparatus practical for its commercial performance. But the principle of the invention is believed broad in scope and capable of application in a wide variety of forms. For instance, air, or gas, has been referred to as a fluid suitable for inflating when, obviously, liquids, such as water or glycerine, could be employed by merely providing a valve-controlled exit for their escape at a rate and in a quantity proportionate to the changing volume of the pulley-band as it is being formed to tire shape. Air, or gas, under pressure from a source outside of the press may, or may not, be employed, and when no gas from an outside source is employed, that which is trapped upon initially sealing the bead portions of the casing may be vented, if necessary, to prevent the inflating gas attaining an undue degree of pressure. And while it is preferred to employ a sealing device having flanged portions, such as 30 Fig. 4, 61 Fig. 8, 80 Fig. 11 and 102 Fig. 14, which flanged portions better insure a fluid tight seal, it is to be understood that these flanged portions are not essential in the curing and shaping of the tire. They may be removed as permitted by the construction illustrated in Fig. 14, after sufficiently reducing the pressure within the tire. With the bead-engaging portions of the tire thus mounted on the sealing device, the tire may be mounted in a vulcanizing mold which contacts directly with the outside bead-engaging portions. In other words, the outer flanged portions of the sealing device are not essential in the curing, and may be removed and the sections of the mold brought into direct contact with the entire outer surface of the tire. These and other alterations are comprehended within the invention for an understanding of whose scope reference should therefore be made to the accompanying claims.

Having thus described our invention, what we claim and desire to protect by Letters Patent is:

1. That method of making a tire casing for motor vehicles which consists in, forming a pulley-band to tire shape by means of fluid under pressure in direct contact with its interior, retaining the thus-shaped casing in form by trapping fluid under pressure in direct contact with its inner surface, and subsequently vulcanizing the casing.

2. That method of making a tire casing for motor vehicles which consists in, building a laminated pulley-band of vulcanizable rubber composition and strain-resisting-elements, forming the pulley-band to tire shape by means of fluid in direct contact with its inner surface and mounting its bead portions on an annulus, and subsequently vulcanizing the thus-mounted casing between rigid mold members.

3. That method of making a tire casing for motor vehicles which consists in, building a laminated pulley-band of vulcanizable rubber composition and strain-resisting-elements, forming the pulley-band to tire shape by means of gas under pressure in contact with its interior and sealing off the space between its bead portions, and subsequently vulcanizing the casing without breaking the seal of its beaded portions.

4. That method of making a tire casing for motor vehicles which consists in, building a laminated pulley-band of vulcanizable rubber composition and strain-resisting-elements, incorporating bead members in the pulley-band, forming the pulley-band to tire shape by means of gas directly contacting its inner surface and simultaneously mounting and sealing its bead portions on a support, and subsequently vulcanizing the casing thus shaped and mounted on the support.

5. That method of making a tire casing for motor vehicles which consists in, building a laminated pulley-band of vulcanizable rubber composition and strain-resisting-elements, forming the pulley-band in tire shape by means of gas directly contacting its inner surface and retaining it formed thereby, and subsequently vulcanizing the casing while sustained by fluid under pressure and between rigid mold members.

6. That method of making a tire casing for motor vehicles which consists in, building a laminated pulley-band of vulcanizable rubber composition and strain-resisting-elements, incorporating bead members in the pulley-band, forming the pulley-band to tire shape by means of gas directly contacting its inner surface and simultaneously rolling the bead portions of the pulley-band onto a sealing-ring, and subsequently vulcanizing the casing thus shaped and mounted.

7. That method of making a tire casing for motor vehicles which consists in, building a laminated pulley-band of vulcanizable rubber composition and strain-resisting-elements, substantially closing the ends of the pulley-band, forcing the ends towards one another while maintaining them closed and simultaneously forming the pulley-band to tire shape by means of fluid under pressure directly contacting its inner surface, sealing off the space between the bead portions of the pulley-band, and subsequently vulcanizing the casing.

8. That method of making a tire casing for motor vehicles which consists in, building a laminated pulley-band of vulcanizable rubber composition and strain-resisting-elements, incorporating bead members in the pulley-band, inserting a bead-spacing-member between the bead portions of the pulley-band, sealing off the inside of each bead portion of the pulley-band with carrier-rings shaped to interfit with the bead-spacing-member, moving the bead portions of the pulley-band into contact with the opposite sides of the spacing member while simultaneously forming the pulley-band to tire shape by means of gas in direct contact with its inner surface, locking the carrier-rings and bead-spacing-member together to form a sealing-device and maintain the casing inflated, and subsequently vulcanizing the casing.

9. That method of making a tire casing for motor vehicles which consists in, building a laminated pulley-band of vulcanizable rubber composition and strain-resisting-elements, forming the pulley band to tire shape by means of air directly against its inner surface and simultaneously mounting its bead portions on an annular sealing-device so as to trap air under pressure therein, substantially replacing the air with an inert fluid medium under pressure, and vulcanizing the casing finally at least under a wall-compacting-pressure.

10. Apparatus for forming a pulley-band into the shape of a tire casing for motor vehicles including in combination, an annular device for closing off the space between the bead portions of a formed casing, and means for forming the pulley-band to tire shape by fluid directly contacting its interior and for simultaneously mounting and sealing the bead portions on the annular device.

11. Apparatus for forming a pulley-band into the shape of a tire casing for motor vehicles including in combination, a sealing-device having a plurality of separable parts, and means for assembling the parts of the sealing-device and securing them together while forming a pulley-band to tire shape and mounting its bead portions substantially fluid-tight on opposite sides of the sealing device.

12. Apparatus for forming a pulley-band into the shape of a tire casing for motor vehicles including in combination, a sealing-device having separable flanged portions, means for moving the flanged portions to a predetermined relation and sealing the bead portions of a pulley-band thereon fluid tight, and means for trapping a predetermined volume of gas between the first-mentioned means and the pulley-band whereby the pulley-band may be shaped to tire form and mounted on the sealing-device preparatory to vulcanization between rigid mold members on a core of gas.

13. Apparatus for forming a pulley-band into the shape of a tire casing for motor vehicles including in combination, means for relatively shifting the bead portions of the pulley-band and simultaneously forming it to tire shape by means of fluid directly contacting its interior, and means upon which the bead portions of the shaped pulley-band during the forming operation may be mounted and the casing maintained in tire shape by the fluid ready for introduction between rigid mold members.

14. Apparatus for forming a pulley-band into the shape of a tire casing for motor vehicles including in combination, means for relatively shifting the beaded portions of the pulley-band and simultaneously compressing fluid directly contacting with its interior to form it to tire shape, and means readily demountable from the first-mentioned means upon which the bead portions of the pulley-band may be mounted and sealed preparatory to introduction of the fluid sustained casing between rigid mold members.

15. Apparatus for forming a pulley-band into the shape of a tire casing for motor vehicles including in combination, means for compressing fluid and applying it directly to the interior of a pulley-band, rigid annular means for supporting the bead portions of the pulley-band and closing off the space therebetween, and fluid tight devices between the compressing means and the bead portions of the pulley-band whereby the pulley-band may be formed to tire shape and simultaneously mounted on opposite sides of the rigid annular means with trapped fluid sustaining the formed casing.

16. Apparatus for forming a pulley-band into the shape of a tire casing for motor vehicles including in combination, a press having abutment members and means for moving at least one of the abutment members relative to the other means bodily removable from the press upon which the bead portions of the pulley-band may be mounted and sealed in predetermined relation, and means for establishing a fluid tight joint between the bead portions of the pulley-band and the abutment members of the press whereby upon operation of the press the pulley-band may be formed to tire shape and supported therein by compressed fluid ready for introduction between rigid mold members.

17. Apparatus for forming a pulley-band into the shape of a tire casing for motor vehicles including in combination, a press having abutment members and means for moving at least one of the abutment members relative to the other, a circular device for supporting and bridging the space between the bead portions of a tire casing having bead-engaging-members independently associable with the opposite edges of the pulley-band, means for establishing fluid tight connections between the bead-engaging-members of the device and the abutment members of the press whereby upon operation of the latter the pulley-band may be formed to tire shape with its bead portions sealed fluid tight, and means for holding the bead-engaging-members against separation.

18. Apparatus for forming a pulley-band into the shape of a tire casing for motor vehicles including in combination, a press having abutment members and means for moving at least one of the members relative to the other, a device having interfitting inside-, and outside-, bead-engaging-portions for confining the bead portions of the tire casing, the outside-bead-engaging-portions of said device at least being separable one from the other, means for sealing off a predetermined volume of fluid within the pulley-band and between the outside-bead-engaging-portions of the device whereby upon operation of the press the pulley-band may be formed to tire shape by means of the fluid directly contacting its interior, and means for holding the outside-, and inside-, bead-engaging-portions of the device after the pulley-band has been formed to tire shape and with its bead portions sealed substantially fluid tight to maintain the casing filled with trapped fluid.

19. Apparatus for forming a pulley-band into the shape of a tire casing for motor vehicles including in combination, a press having abutment members, means for moving at least one of the abutment members relative to the other, a device having separable portions for supporting the bead portions of the tire casing fluid tight thereon, means for centering the separable portions of the device relative to one another, means for trapping and permitting compression of a predetermined volume of fluid inside the pulley-band and between the separable portions of the device whereby upon operation of the press the pulley-band may be formed to tire shape by means of fluid above atmospheric pressure directly contacting its interior, and self-acting means for holding the separable portions of the device in predetermined spaced relation after the pulley-band has been formed to tire shape whereby it may be maintained inflated after removal from the press.

20. Apparatus for forming a pulley-band into the shape of a tire casing for motor vehicles including in combination, a press having abutment members and means for moving at least one of the abutment members relative to the other, a sealing device having angular-form and separable ring-portions with opposed convergent surfaces for centering the same upon the bead portions of the pulley-band and also having a circular seat for the beads of the casing, co-operating means on the abutment members and ring-portions of the sealing-device for centering the latter, means for sealing off a predetermined space within the pulley-band and between its beaded portions whereby upon operation of the press the pulley-band may be formed to tire shape directly by means of fluid under pressure contacting its interior, and means for locking the ring-portions of the sealing-device against separation after their movement into a predetermined spaced relation whereby the pulley-band may be made ready for vulcanization in tire shape in one operation of the press.

Signed at New York, New York, this 23rd day of September, 1921.

ERNEST HOPKINSON.
JOHN P. COE.